United States Patent
Michaelraj

(10) Patent No.: US 12,214,997 B1
(45) Date of Patent: Feb. 4, 2025

(54) GRAPPLE ACCUMULATION ARM FOR LOG GRAPPLE MACHINE

(71) Applicant: DEERE & COMPANY, Moline, IL (US)

(72) Inventor: Antony Maria Thomas Benny Michaelraj, Tamil Nadu (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/362,641

(22) Filed: Jul. 31, 2023

(51) Int. Cl.
*B66C 1/58* (2006.01)
*A01G 23/00* (2006.01)

(52) U.S. Cl.
CPC ............ *B66C 1/585* (2013.01); *A01G 23/003* (2013.01)

(58) Field of Classification Search
CPC ..... B25J 15/0009; B25J 15/10; A01G 23/003; A01G 23/006; A01G 23/081; A01G 23/08; A01G 23/097; B65F 3/04; B65F 2003/023; B66F 9/18; B66C 1/585; B66C 1/425; B66C 3/005; B60P 1/483; B60P 3/41

See application file for complete search history.

(56) References Cited

U.S. PATENT DOCUMENTS

| | | | | |
|---|---|---|---|---|
| 3,727,653 A * | 4/1973 | Tucek | ................... | A01G 23/089 144/34.1 |
| 3,782,567 A * | 1/1974 | Likas | ..................... | B60P 1/483 414/731 |
| RE29,235 E * | 5/1977 | Kurelek | ............... | A01G 23/081 144/34.1 |
| 4,175,598 A * | 11/1979 | Stoychoff | ............ | A01G 23/081 144/34.1 |
| 5,004,026 A * | 4/1991 | MacLennan | ......... | A01G 23/081 144/34.1 |
| 5,697,412 A * | 12/1997 | Kurelek | ............... | A01G 23/081 144/34.5 |
| 6,363,980 B1 * | 4/2002 | Kurelek | ............... | A01G 23/081 144/34.1 |
| 6,374,877 B1 * | 4/2002 | Wildey | ................ | A01G 23/081 144/34.1 |
| 6,962,178 B2 * | 11/2005 | Duval | .................. | A01G 23/097 144/34.1 |

(Continued)

OTHER PUBLICATIONS

Forester Croatia. John Deere skidder on tracks!Youtube Video. Available Nov. 5, 2019 at https://www.youtube.com/watch?v=eGToBy1VFyA (11 pages).

(Continued)

*Primary Examiner* — Gregory W Adams
(74) *Attorney, Agent, or Firm* — Michael Best & Friedrich LLP

(57) ABSTRACT

A log grapple machine comprises a frame supporting a boom. The boom is controllable by a boom actuator. The log grapple machine further comprises a support member having a first end coupled to the boom and a second end coupled to a grapple box. The support member supports the grapple box. The log grapple machine further comprises a primary grapple tong coupled to the grapple box and movable between an open position and a closed position. The log grapple machine further comprises an accumulation arm coupled to the grapple box and movable between an open position and a closed position.

14 Claims, 6 Drawing Sheets

(56) References Cited

U.S. PATENT DOCUMENTS

| | | | | |
|---|---|---|---|---|
| 7,228,880 B2* | 6/2007 | Taillon | ............... | A01G 23/08 |
| | | | | 144/34.1 |
| 7,699,081 B2* | 4/2010 | Mauchlen | ............ | A01G 23/081 |
| | | | | 144/34.1 |
| 8,066,040 B2* | 11/2011 | Di Sabatino | ......... | A01G 23/081 |
| | | | | 144/34.1 |
| 8,066,043 B2* | 11/2011 | Leist | ..................... | A01G 23/08 |
| | | | | 144/34.1 |
| 9,796,104 B2* | 10/2017 | Barsotti Giovanni | ... | B26D 3/16 |
| 10,184,304 B2* | 1/2019 | LaValley | ................ | E02F 3/965 |
| 10,561,075 B2* | 2/2020 | Lamontagne | ........ | A01G 23/081 |
| 11,141,867 B2* | 10/2021 | Wang | ................... | B25J 15/0061 |
| 2021/0400888 A1* | 12/2021 | Neumann | ............ | A01G 23/091 |

OTHER PUBLICATIONS

Logger Cody. Spruce Logging just over the Adirondack Border. Available Aug. 4, 2020 at https://www.youtube.com/watch?v=zZsIN6AdKHo (5 pages).

* cited by examiner

GRAPPLE ACCUMULATION ARM FOR LOG GRAPPLE MACHINE

BACKGROUND

The present disclosure relates to forestry equipment, and more particularly to log grapple equipment.

SUMMARY

In one independent aspect, a log grapple machine may comprise a frame supporting a boom. The boom may be controllable by a boom actuator. The log grapple machine may further comprise a cross head having a first end coupled to the boom and a second end coupled to a grapple box. The log grapple machine may further comprise a primary grapple tong coupled to the grapple box. The primary grapple tong may be movable between an open position and a closed position. The log grapple machine may further comprise an accumulation arm coupled to the grapple box. The accumulation arm may be movable between an open position and a closed position.

A log grapple machine may include a primary grapple tong that is movable relative to a grapple box about a primary grapple tong axis. An accumulation arm may include a first section and a second section. The first section may be movable relative to the grapple box about a first section axis. The second section may be movable relative to the first section about a second section axis that is different from the first section axis.

A log grapple machine may include a primary grapple tong axis that is collinear with a first section axis.

A log grapple machine may include a second section that is selectively positionable between an extended position and a retracted position by moving the second section about a second section axis relative to a first section.

A log grapple machine may include a biasing member that biases a second section toward an extended position.

A log grapple machine may include an accumulation arm such that a position of the accumulation arm is controllable by an accumulation arm actuator system based at least in part on a signal from at least one of a primary grapple tong position sensor and an accumulation arm position sensor.

A log grapple machine may include a primary grapple tong that is a first primary grapple tong and is movable about a first primary grapple tong axis. The log grapple machine may further include a second primary grapple tong movable about a second primary grapple tong axis between an open position and a closed position. The log grapple machine may further include an accumulation arm that is a first accumulation arm movable about a first accumulation arm axis. The log grapple machine may further include a second accumulation arm movable about a second accumulation arm axis between an open position and a closed position.

A log grapple machine may include first and second primary grapple tongs that define a first internal area when the first and second primary grapple tongs are both in the closed position. The first internal area may be defined as a projection in a plane orthogonal to a first primary grapple tong axis. The first internal area may be at least partially bounded by the first and second primary grapple tongs. The log grapple machine may further include first and second accumulation arms that define a second internal area when the first and second accumulation arms are both in the closed position. The second internal area may be defined as a projection in a plane orthogonal to the first accumulation arm axis. The second internal area may be at least partially bounded by the first and second accumulation arms.

A log grapple machine may include a first internal area that is greater than the second internal area.

A log grapple machine may include a second internal area that forms a shape that fits within a shape of a first internal area.

A log grapple machine may include first and second accumulation arms that are configured to hold a log when first and second primary grapple tongs are in an open position.

A log grapple machine may include a control system configured to synchronize an operation of first and second primary grapple tongs and of first and second accumulation arms.

In another independent aspect, a grapple system may comprise a first primary grapple tong and a second primary grapple tong. The first and second primary grapple tongs may be pivotable between an open position and a closed position. The first and second primary grapple tongs may at least partially define a first internal area when the first and second primary grapple tongs are in the closed position. The grapple system may further comprise a first accumulation arm and a second accumulation arm. The first and second accumulation arms may be pivotable between an open position and a closed position. The first and second accumulation arms may at least partially define a second internal area when the first and second accumulation arms are in the closed position. The second internal area may be smaller than the first internal area. The first and second accumulation arms may be independently operable with respect to the first and second primary grapple tongs to retain material within the second internal area when the first and second primary grapple tongs move from the closed position to the open position.

A grapple system may include an accumulation arm that is selectively automatically operable and manually operable.

A grapple system may be configured such that an operation of an accumulation arm is synchronized with an operation of a primary grapple tong.

A grapple system may include a primary grapple tong that is configured to perform a first grapple action on a material and may include an accumulation arm that is configured to perform a second grapple action on a material following the first grapple action. The second grapple action may retain the material within a second internal area.

A grapple system may be configured to grapple a material that is a first material, and a primary grapple tong may be configured to perform a third grapple action on a second material such that both the first material and the second material are retained simultaneously by the grapple system.

A grapple system may be configured to grapple a material, wherein the material includes a log.

In another independent aspect, a control system for a log grapple machine comprises a processor including an interface algorithm having an analyzer and a synchronizer. The processor is selectively operable in either a manual mode or an automatic mode. The processor is configured to receive a primary grapple tong position sensor signal from a primary grapple tong position sensor and to receive an accumulation arm position sensor signal from an accumulation arm position sensor. The processor is configured to control a position of the primary grapple tong and a position of the accumulation arm based at least in part on the primary grapple tong position sensor signal and the accumulation arm position sensor signal.

A control system may include a processor that is configured to control an accumulation arm to hold a log when a primary grapple tong is in an open position.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

Figure 1:
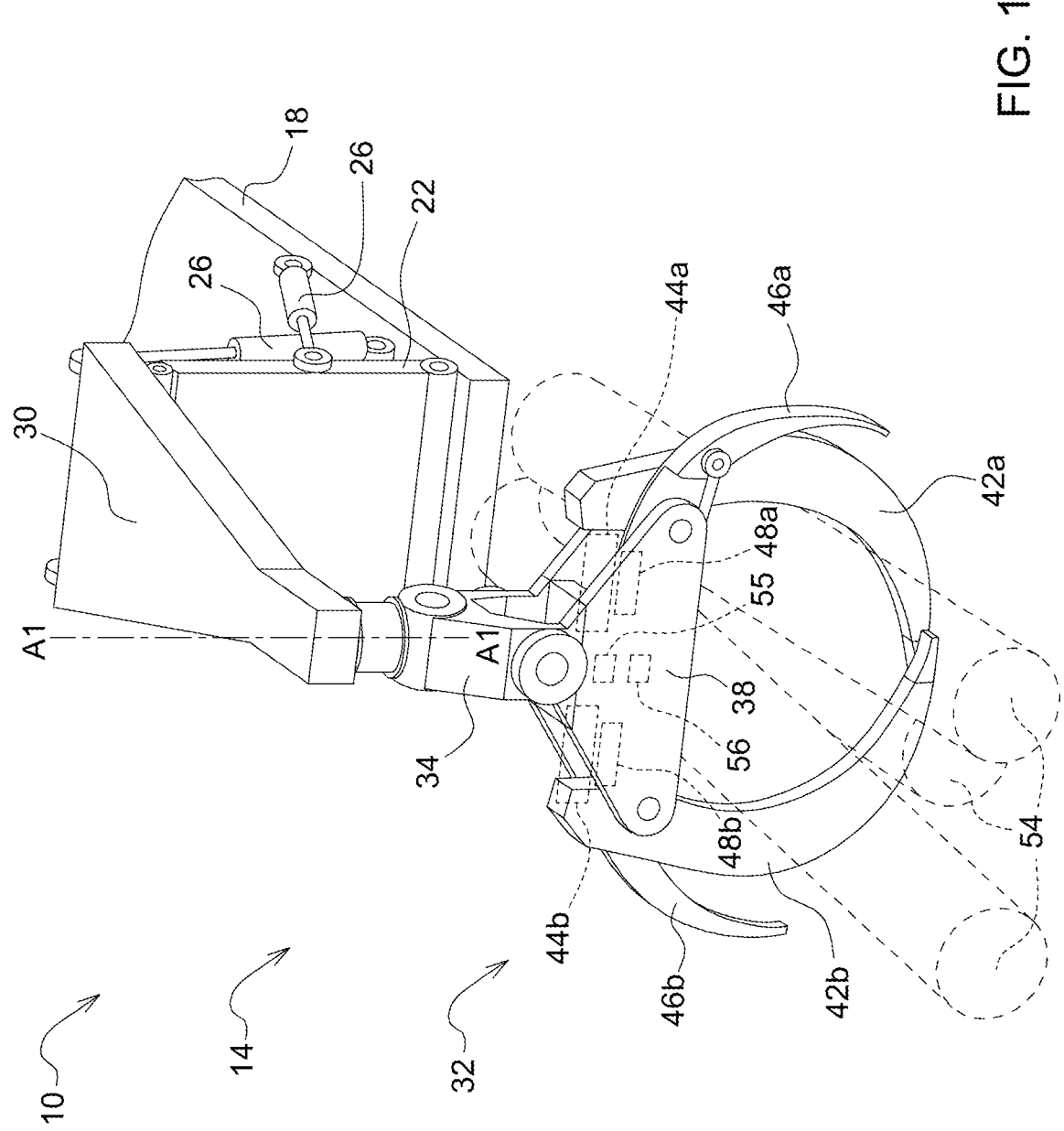
FIG. 1 illustrates a front perspective view of a grapple, arch, and boom mechanism grappling logs according to an embodiment of the disclosure.

FIG. 1 illustrates a portion of a forestry machine which may be, more specifically, a log grapple machine 10 including a grapple, arch, and boom mechanism 14. The grapple, arch, and boom mechanism 14 includes a frame 18 and may further include a first link 22, one or more boom actuators which may be boom cylinders 26, and a second link 30 coupled to the frame 18 by the first link 22 and the boom cylinders 26. In some embodiments the second link 30 may be referred to as a boom and/or an arch, in some embodiments the frame 18 may be referred to as a boom and/or an arch, and in some embodiments the first link 22 and the second link 30 together may be referred to as a boom and/or an arch. The grapple, arch, and boom mechanism 14 further includes a grapple system 32 including a support member such as a cross head 34 that supports a grapple box 38. A first end of the cross head 34 is mounted to an end of the second link 30, and a second end of the cross head 34 is mounted to the grapple box 38. The cross head 34 rotatably and/or pivotably couples the grapple box 38 to the frame 18. In other embodiments, the grapple box 38 may be coupled to the frame 18 in another manner. The boom cylinders 26 may control a position of the first link 22, the second link 30, the cross head 34, and/or the grapple box 38 with respect to the frame 18.

With continued reference to FIG. 1, the grapple system 32 also includes two primary grapple tongs 42a, 42b that are movably mounted to the grapple box 38. Primary grapple tong actuator systems 44a, 44b (shown schematically in FIG. 1) may control a movement (in some embodiments, a pivoting movement) of the primary grapple tongs 42a, 42b.

Figure 4:
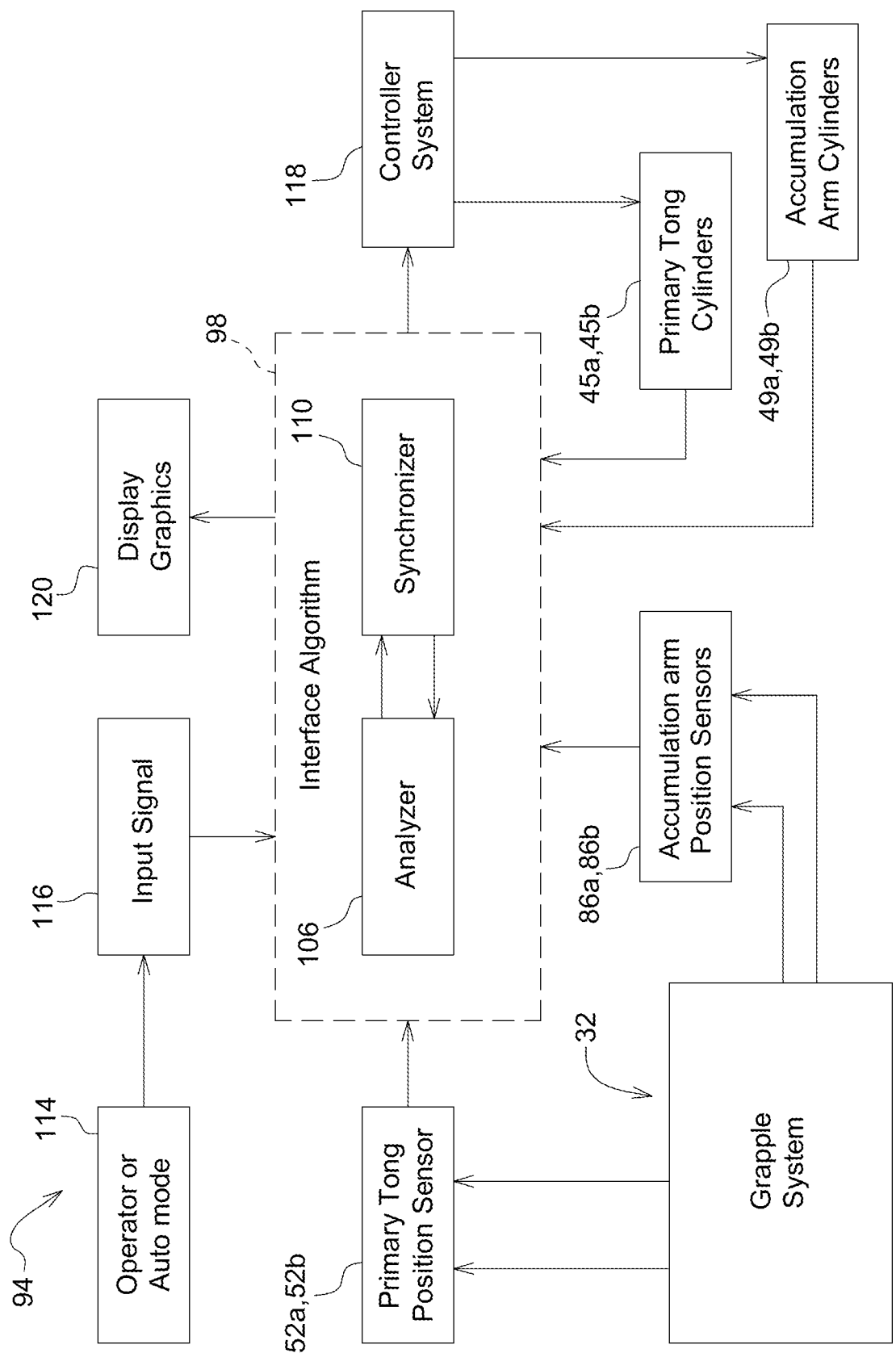
FIG. 4 illustrates a schematic view of a control system of the grapple, arch, and boom mechanism of FIG. 1.

Each primary grapple tong actuator system 44a, 44b may include one or more primary grapple tong hydraulic cylinders 45a. 45b (shown schematically in FIG. 4). In some embodiments, a primary grapple tong hydraulic flow equalizer 55 may divide hydraulic fluid between the primary grapple tong hydraulic cylinders 45a, 45b such that each of the primary grapple tongs 42a, 42b is maintained at an even position with respect to the other of the primary grapple tongs 42a, 42b (that is, such that the primary grapple tongs 42a, 42b are generally symmetrical about an axis A1 of the cross head 34). In some embodiments the axis A1 may be generally perpendicular to a gravitational equipotential surface, in some embodiments the axis A1 may be generally vertical, and in some embodiments the axis A1 may be defined by a circular portion of the cross head 34 that couples to a component such as the second link 30. In some embodiments, a single primary grapple tong actuator system (and possibly a single primary grapple tong hydraulic cylinder) may control a movement of both primary grapple tongs 42a, 42b. The grapple system 32 also includes two accumulation arms 46a, 46b that are movably mounted to the grapple box 38. Accumulation arm actuator systems 48a, 48b (shown schematically in FIG. 1) may control a movement of the accumulation arms 46a, 46b. Each accumulation arm actuator system 48a, 48b may include one or more accumulation arm hydraulic cylinders 49a, 49b (shown schematically in FIG. 4). In some embodiments, an accumulation arm hydraulic flow equalizer 56 may divide hydraulic fluid between the accumulation arm hydraulic cylinders 49a, 49b such that each of the accumulation arms 46a, 46b is maintained at an even position with respect to the other of the accumulation arms 46a, 46b (that is, such that the accumulation arms 46a, 46b are generally symmetrical about the axis A1 of the cross head 34). In some embodiments, a single accumulation arm actuator system (and possibly a single accumulation arm hydraulic cylinder) may control a movement of both accumulation arms 46a, 46b.

Figure 2:
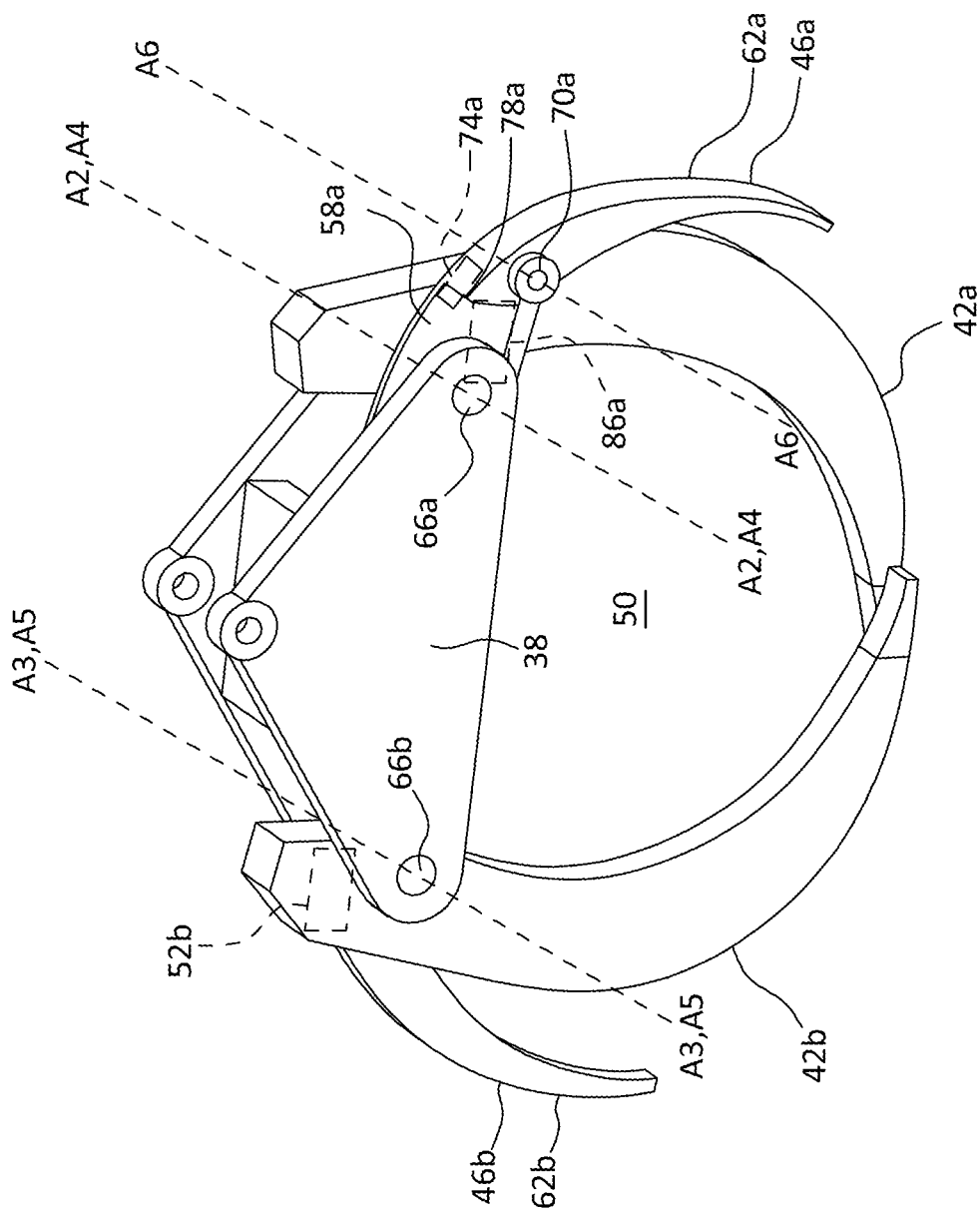
FIG. 2 illustrates a front perspective view of the grapple system of the grapple, arch, and boom mechanism of FIG. 1 with accumulation arms in an open and extended position.

With reference to FIG. 2, the primary grapple tongs 42a, 42b are pivotable between a first (open) position (FIG. 5) and a second (closed) position (FIGS. 1, 2, 3A, and 3B). The primary grapple tongs 42a, 42b may be pivotable or otherwise movable such that the first primary grapple tong 42a is movable about a first primary grapple tong axis A2 and such that the second primary grapple tong 42b is movable about a second primary grapple tong axis A3. The first primary grapple tong axis A2 may be defined by and/or collinear with a first pivot point 66a, and the second primary grapple tong axis A3 may be defined by and/or collinear with a second pivot point 66b. The primary grapple tongs 42a, 42b may be curved inwardly such that, when the primary grapple tongs 42a, 42b are in the closed position, the primary grapple tongs 42a, 42b define a first internal area 50 (FIG. 2) bounded at least partially by the primary grapple tongs 42a, 42b and/or the grapple box 38. A first primary grapple tong position sensor 52a (FIG. 3A) may be coupled to the grapple, arch, and boom mechanism 14, and more specifically to the grapple box 38, and configured to determine a relative position (for example, a degree of pivoting) of the first primary grapple tong 42a with respect to other components grapple, arch, and boom mechanism such as the grapple box 38. A second primary grapple tong position sensor 52b (FIG. 2) may be coupled to the grapple, arch, and boom mechanism 14, and more specifically to the grapple box 38, and configured to determine a relative position (for example, a degree of pivoting) of the second primary grapple tong 42b. Various embodiments of log grapple machines 10 may be classified based on, for example, a size of the first internal area 50. Log grapple machines 10 having a first internal area 50 that is relatively small may be capable of grappling a relatively small number and/or size of logs 54 (FIG. 1), and log grapple machines 10 having a first internal area 50 that is relatively large may be capable of grappling a relatively large number and/or size of logs 54 (FIG. 1). The logs 54 that are able to be grappled by the log grapple machine 10 may be of various sizes, including smaller than 200 lb, approximately 200 lb, between 200 lb and 1,000 lb, approximately 1,000 lb, between 1,000 lb and 5,000 lb, approximately 5,000 lb, and more than 5,000 lb.

Figure 3A:
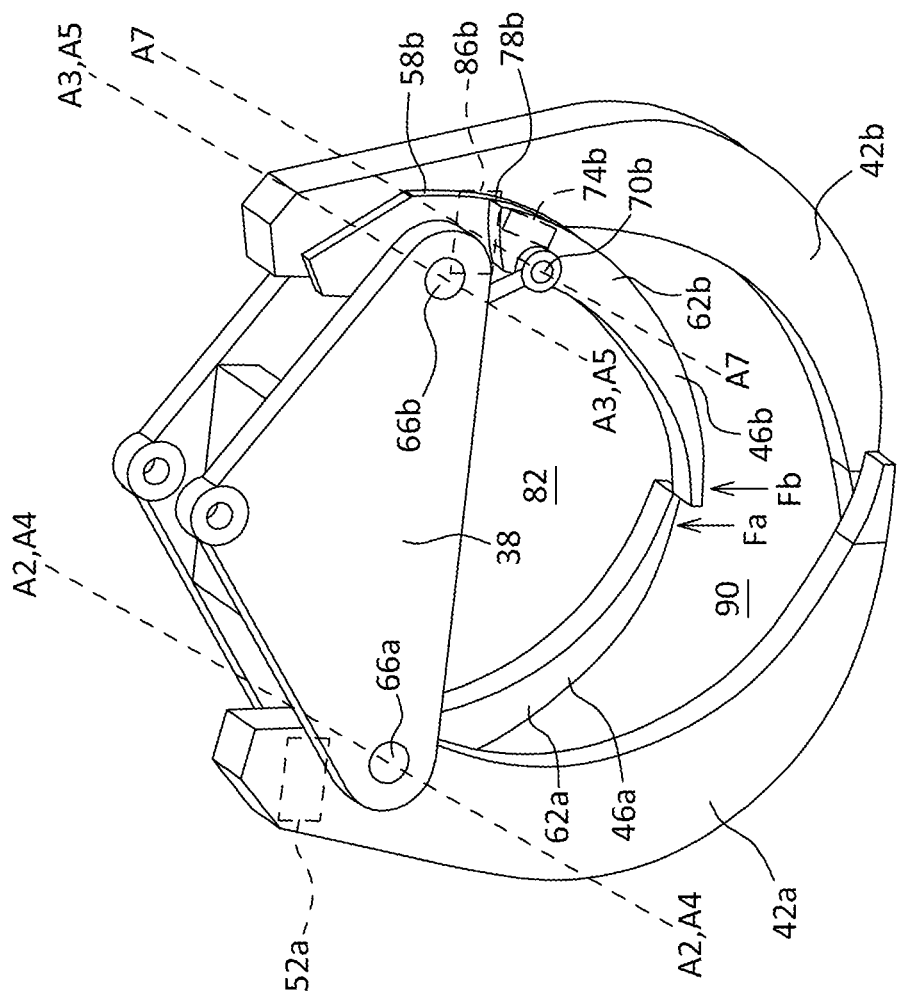
FIG. 3A illustrates a rear perspective view of the grapple system of the grapple, arch, and boom mechanism of FIG. 1 with accumulation arms in a closed and extended position.
Figure 3B:
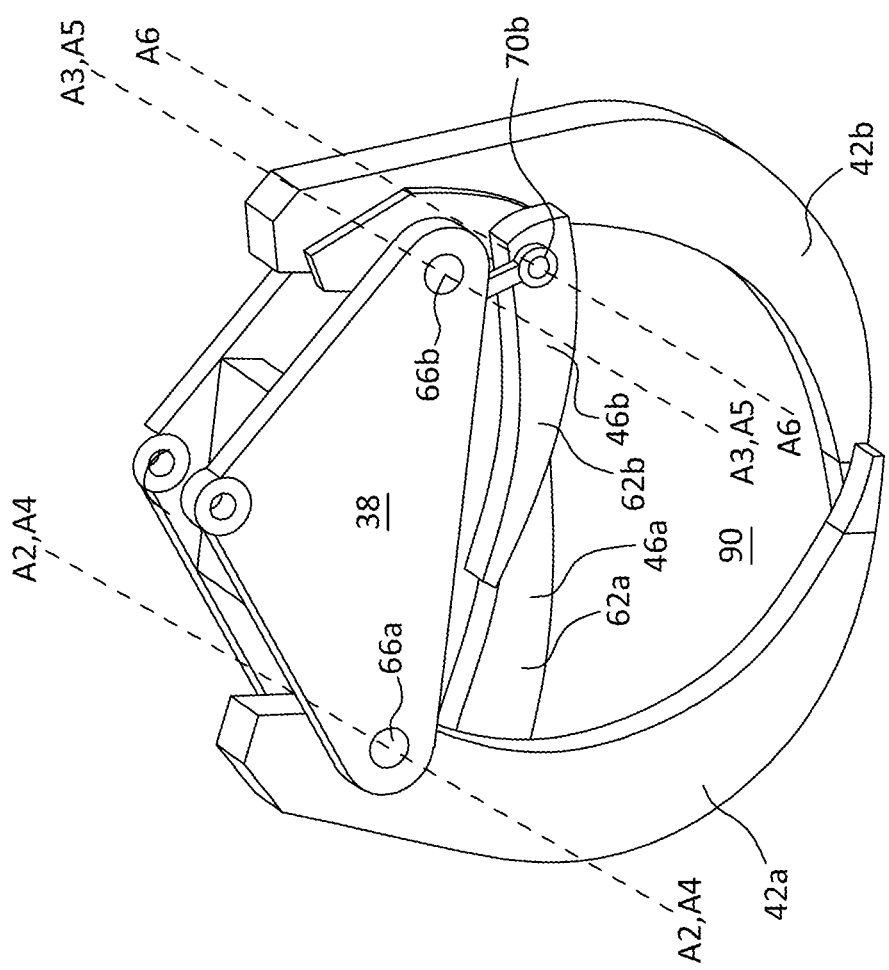
FIG. 3B illustrates a rear perspective view of the grapple system of the grapple, arch, and boom mechanism of FIG. 1 with accumulation arms in a closed and retracted position.

With reference to FIGS. 2, 3A, and 3B, each accumulation arm 46a, 46b may include a first section 58a, 58b and a second section 62a, 62b. The first sections 58a, 58b are mounted to the grapple box 38 such that the accumulation arms 46a, 46b are pivotable between a first (open) position (FIG. 2) and a second (closed) position (FIGS. 3A and 3B). The first section 58a may pivot about a first section axis A4, and the second section 58b may pivot about a first section axis A5. The first section axis A4 may be defined by and/or may be collinear with the first pivot point 66a, and the first section axis A5 may be defined by and/or may be collinear with the second pivot point 66b. The first primary grapple tong axis A2 may be parallel to and may further be collinear with the first section axis A4. The second primary grapple tong axis A3 may be parallel to and may further be collinear with the first section axis A5. The second sections 62a, 62b may be pivotably mounted to the first sections 58a, 58b about second pivot points 70a, 70b. The second pivot point 70a may define a second section axis A6 about which the second section 62a is movably mounted to the first section 58a. The second pivot point 70b may define a second section axis A7 about which the second section 62b is movably mounted to the first section 58b. The second section axis A6 may be parallel to any or all of the axes A2, A3, A4, A5, A7. The second section axis A7 may be parallel to any or all of the axes A2, A3, A4, A5, A6. Any or all of the axes A2, A3, A4, A5, A6, A7 may be orthogonal to a plane in which any or all of the primary grapple tongs 42a, 42b, the first sections 58a, 58b, and the second sections 62a, 62b move (for example, pivot). A range of motion of the second sections 62a, 62b relative to the first sections 58a. 58b may extend between an extended position (FIGS. 1, 2, 3A, and 5) and a retracted position (FIG. 3B) in which the second sections 62a, 62b pivot inwardly toward the grapple box 38 about the second pivot points 70a. 70b and relative to the first sections 58a. 58b. The second sections 62a, 62b may be biased toward the extended position by a biasing member such as one or more springs 74a, 74b (shown schematically in FIGS. 2 and 3A) that extend between the first section 58a, 58b and the second section 62a, 62b. Forces Fa, Fb (FIG. 3A) may be applied to one or both of the second sections 62a, 62b of the accumulation arms 46a, 46b in a direction toward the grapple box 38 to cause the second sections 62a, 62b to move against the bias of the springs 74a, 74b. In other words, the forces Fa, Fb may cause the second sections 62a, 62b to pivot toward the grapple box 38 with respect to first sections 58a, 58b about the second pivot points 70a. 70b. The second sections 62a, 62b may pivot or otherwise move independently of each other and of the primary grapple tongs 42a, 42b. For example, the accumulation arms 46a, 46b may be in an open and extended position, an open and retracted position, a closed and extended position, a closed and retracted position, or a range of positions therebetween. An extent of the range of motion of the second sections 62a, 62b relative to the first sections 58a, 58b may be limited by stop members 78a, 78b that are attached to the second sections 62a, 62b and that physically bear against the first sections 58a, 58b (or another component) when the second sections 62a, 62b are fully in the extended position and/or the retracted position. The accumulation arms 46a, 46b are configured such that the accumulation arms 46a, 46b may pivot or otherwise move independently of the primary grapple tongs 42a, 42b. In other words, the accumulation arms 46a, 46b may open and close about the first pivot points 66a, 66b independently of the primary grapple tongs 42a, 42b.

With continued reference to FIGS. 2, 3A, and 3B, the accumulation arms 46a, 46b may be curved inwardly such that, when the accumulation arms 46a, 46b are in the closed position, the accumulation arms 46a, 46b define a second internal area 82 within the accumulation arms 46a, 46b. A first accumulation arm position sensor 86a may be coupled to the grapple, arch, and boom mechanism 14, and more specifically to the grapple box 38, and configured to determine a relative position (for example, a degree of pivoting) of the first accumulation arm 46a (FIG. 2). A second accumulation arm position sensor 86b may be coupled to the grapple, arch, and boom mechanism 14, and more specifically to the grapple box 38, and configured to determine a relative position (for example, a degree of pivoting) of the second accumulation arm 46b (FIG. 3A). The second internal area 82 may be a subset of the first internal area 50. The second internal area 82 may form a shape that is able to fit within a shape of the first internal area 50. A third internal area 90 may be defined as an area between the primary grapple tongs 42a, 42b when the primary grapple tongs 42a, 42b are in the closed position and the accumulation arms 46a, 46b when the accumulation arms 46a, 46b are in the closed position. The second internal area 82 and the third internal area 90 together at an instant in time may approximate the first internal area 50. The areas 50, 82, 90 may be defined as projections in a plane that is orthogonal to any or all of the axes A2, A3, A4, A5, A6, A7 so that sizes, shapes, and positions of the areas 50, 82, 90 may be compared.

With reference to FIG. 4, a control system 94 for operating the grapple, arch, and boom mechanism 14 includes a processor 98. As used in this description and in the appended claims, the terms "a processor" and "the processor" may refer to a single processor or to a plurality of processors. Similarly, other instances of the articles "a" and "an" may also refer to plural referents. The processor 98 may include an interface algorithm utilizing an analyzer 106 and a synchronizer 110. An operator may set an operation mode 114 of the control system 94 in either a manual ("operator") mode or an automatic ("auto") mode. The operation mode 114 may generate an input signal 116 that is transmitted to the processor 98. The primary grapple tong position sensors 52a. 52b may output signals representing a position of the primary grapple tongs 42a, 42b and transmit the signals to the processor 98. The accumulation arm position sensors 86a, 86b may output signals representing a position of the accumulation arms 46a, 46b and transmit the signals to the processor 98. In other words, the primary grapple tong position sensors 52a, 52b and the accumulation arm position sensors 86a, 86b may provide inputs to the processor 98.

With continued reference to FIG. 4, the processor 98 may output control signals to a controller system 118. The controller system 118 may instruct or otherwise control an operation of the primary grapple tong actuator systems 44a, 44b and the accumulation arm actuator systems 48a, 48b. In embodiments including primary grapple tong hydraulic cylinders 45a, 45b and accumulation arm hydraulic cylinders 49a, 49b, the controller system 118 may instruct or otherwise control an operation of the primary grapple tong hydraulic cylinders 45a, 45b and the accumulation arm hydraulic cylinders 49a, 49b. The primary grapple tong hydraulic cylinders 45a, 45b and the accumulation arm hydraulic cylinders 49a, 49b may provide a feedback loop by facilitating the sending of one or more signals to the processor 98 from the primary grapple tong position sensors 52a, 52b and the accumulation arm position sensors 86a, 86b. Information regarding the grapple system 32, the control system 94, and other components may be displayed to a user via display graphics 120.

Figure 5:
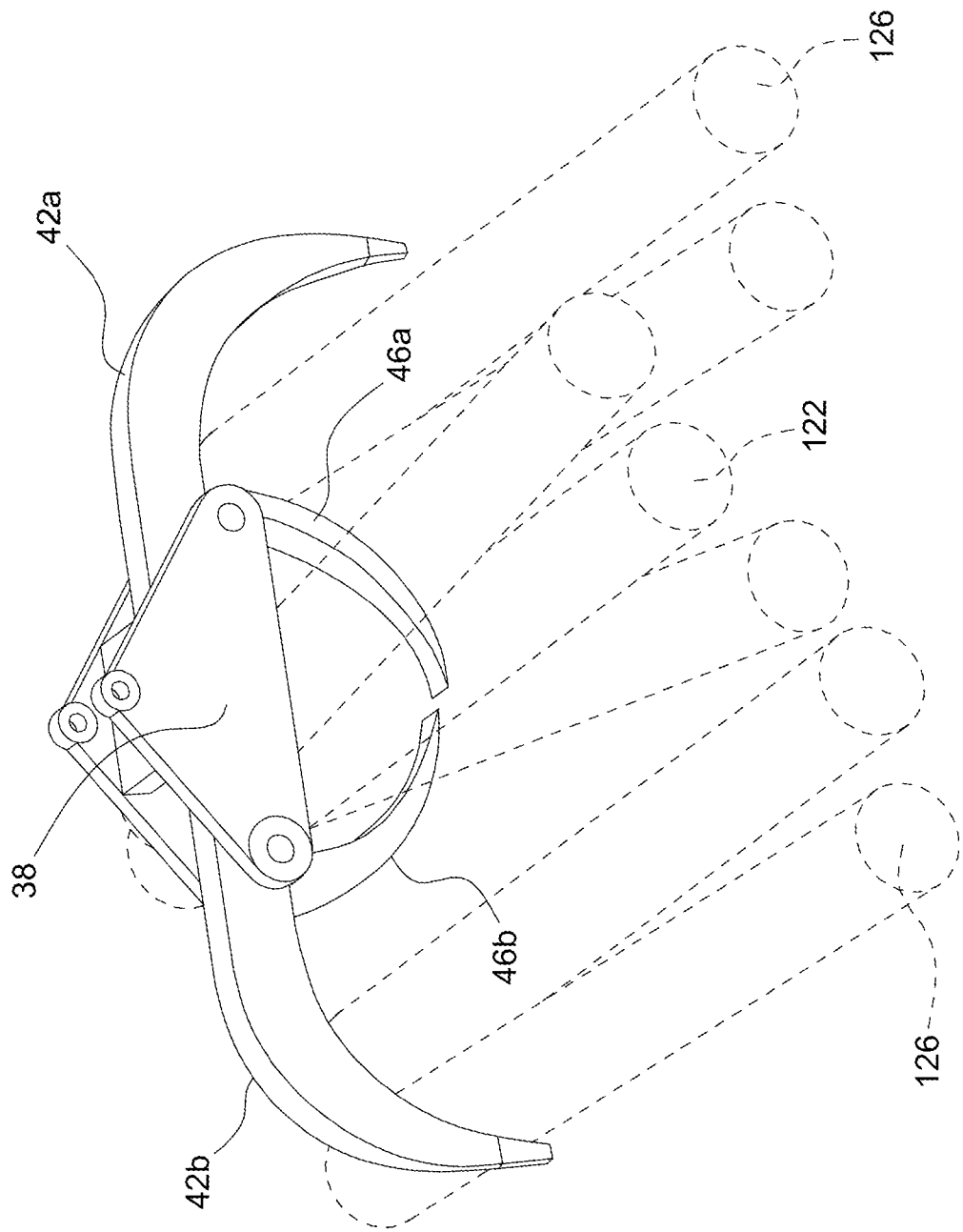
FIG. 5 illustrates a front perspective view of the grapple system of the grapple, arch, and boom mechanism of FIG. 1 with accumulation arms grappling a first log pile and with primary grapple tongs grappling a second log pile.

In operation, and with reference to FIG. 5, after the primary grapple tongs 42a, 42b grapple a first log pile 122, the accumulation arms 46a, 46b may move from the open position (FIGS. 1 and 2) to the closed position (FIGS. 3A and 5) such that the accumulation arms 46a, 46b hold the first log pile 122 in place while the primary grapple tongs 42a, 42b move from the closed position (FIGS. 1, 2, 3A, and 3B) to the open position (FIG. 5). With the first log pile 122 secured by the accumulation arms 46a, 46b, the primary grapple tongs 42a, 42b may grapple a second log pile 126 by surrounding the second log pile 126 with the primary grapple tongs 42a. 42b and moving the primary grapple tongs 42a, 42b from the open position to the closed position. After the primary grapple tongs 42a, 42b grapple the second log pile 126, the accumulation arms 46a, 46b may move from the closed position (FIGS. 3A and 5) to the open position (FIGS. 1 and 2). If the second log pile 126 inhibits a movement of the accumulation arms 46a, 46b from the closed position to the open position, the second log pile 126 may apply forces Fa, Fb (FIG. 3A) to the second sections 62a, 62b of the accumulation arms 46a, 46b to cause the second sections 62a, 62b to pivot toward the grapple box 38 with respect to first sections 58a, 58b (in other words, towards the retracted position shown in FIG. 3B) such that the accumulation arms 46a, 46b may be moved from the closed position to the open position even when logs, such as the logs of the second log pile 126, are present in the third internal area 90 (FIG. 3A). When the accumulation arms 46a, 46b are moved to the open position and the primary grapple tongs 42a, 42b remain in the closed position, both the first log pile 122 and the second log pile 126 may become grappled together within the first internal area 50 (FIG. 2). If an operator desires to grapple a third log pile (not shown), the operator may move the accumulation arms 46a, 46b from the open position (FIGS. 1 and 2) to the closed position (FIGS. 3A and 5) such that the accumulation arms 46a, 46b grapple the first and second log piles 122, 126, allowing the primary grapple tongs 42a, 42b to be opened without losing any logs from the grapple system 32 (that is, by holding the already-grappled logs in the second internal area 82 (FIG. 3A)). This process may be repeated as desired until the first internal area 50 is sufficiently filled with logs. The logs may be deposited in a desired location by opening both the primary grapple tongs 42a, 42b and the accumulation arms 46a, 46b such that both the primary grapple tongs 42a, 42b and the accumulation arms 46a, 46b are open at the same time.

Although an embodiment has been disclosed that is configured to grapple logs, this disclosure may be applied to grapple other materials such as lumber, sticks, bricks, rocks, brush, etc. Various features of the disclosure are set forth in the following claims.

What is claimed is:

1. A log grapple machine comprising:
    a frame supporting a boom, the boom controllable by a boom actuator;
    a support member having a first end coupled to the boom and a second end coupled to a grapple box, the support member supporting the grapple box;
    a grapple tong coupled to the grapple box and movable between an open position and a closed position; and
    an accumulation arm coupled to the grapple box and movable between an open position and a closed position,
    wherein:
        the grapple tong is movable relative to the grapple box about a grapple tong axis,
        the accumulation arm includes a first section and a second section,
        the first section is movable relative to the grapple box about a first section axis,
        the second section is movable relative to the first section about a second section axis that is offset from the first section axis,
        the second section is selectively positionable between an extended position and a retracted position by moving the second section about the second section axis relative to the first section, the log grapple machine further comprising a biasing member configured to bias the second section toward the extended position, and
        the position of the accumulation arm is adjustable based at least in part on a signal from at least one of a grapple tong position sensor or an accumulation arm position sensor.

2. The log grapple machine of claim 1, wherein the grapple tong axis is collinear with the first section axis.

3. The log grapple machine of claim 1, wherein:
    the grapple tong is a first grapple tong movable about a first grapple tong axis, and further including a second grapple tong movable about a second grapple tong axis between an open position and a closed position; and
    the accumulation arm is a first accumulation arm movable about a first accumulation arm axis, and further including a second accumulation arm movable about a second accumulation arm axis between an open position and a closed position.

4. The log grapple machine of claim 3, wherein:
    the first and second grapple tongs are configured to cooperate to define a first internal area projectable in a plane axially spaced therefrom in a direction along the first grapple tong axis and orthogonal to the first grapple tong axis, the first internal area bounded by the first and second grapple tongs when in the closed position, and
    the first and second accumulation arms are configured to cooperate to define a second internal area projectable in the plane, the second internal area bounded by the first and second accumulation arms when in the closed position.

5. The log grapple machine of claim 4, wherein the first internal area is greater than the second internal area.

6. The log grapple machine of claim 4, wherein the second internal area is coplanar with and entirely bounded by the first internal area.

7. The log grapple machine of claim 4, wherein the first and second accumulation arms are configured to hold a log weighing at least 200 lb when the first and second grapple tongs are in the open position.

8. The log grapple machine of claim 7, further including a control system configured to synchronize the first and second grapple tongs with the first and second accumulation arms.

9. A grapple system comprising:

a first grapple tong and a second grapple tong, the first and second grapple tongs pivotable between an open position and a closed position and at least partially bounding a first internal area when the first and second grapple tongs are in the closed position; and a first accumulation arm and a second accumulation arm, the first and second accumulation arms pivotable between an open position and a closed position and at least partially bounding a second internal area when the first and second accumulation arms are in the closed position, the second internal area being smaller than the first internal area, the first and second accumulation arms independently operable with respect to the first and second grapple tongs to retain material within the second internal area when the first and second grapple tongs move from the closed position to the open position, wherein:

the first and second grapple tongs are movable relative to a grapple box about a grapple tong axis, the first and second accumulation arms each include a respective first section and a respective second section, each respective first section is movable relative to the grapple box about a respective first section axis, each respective second section is movable relative to each respective first section about a respective second section axis that is offset from the respective first section axis, each respective second section is selectively positionable between an extended position and a retracted position by moving each respective second section about the respective second section axis relative to the respective first section, the grapple system further comprising respective biasing members configured to bias each respective second section toward the extended position, and the position of the first and second accumulation arms is adjustable based at least in part on a signal from at least one of a grapple tong position sensor or an accumulation arm position sensor.

10. The grapple system of claim 9, wherein the first and second accumulation arms are selectively automatically operable and manually operable.

11. The grapple system of claim 9, wherein an operation of the first and second accumulation arms is synchronizable with an operation of the first and second grapple tongs.

12. The grapple system of claim 9, wherein the first and second grapple tongs are configured to perform a first grapple action and the first and second accumulation arms are configured to perform a second grapple action following the first grapple action, the second grapple action retaining the material within the second internal area.

13. The grapple system of claim 12, wherein the material is a first material and wherein the first and second grapple tongs are configured to perform a third grapple action on a second material such that both the first material and the second material are retained simultaneously by the grapple system.

14. The grapple system of claim 9, wherein the material includes a log weighing at least 200 lb.

* * * * *